United States Patent [19]

Greigger

[11] 4,435,219

[45] Mar. 6, 1984

[54] STABLE INORGANIC COATING COMPOSITION FOR ADHERENT, INORGANIC COATINGS

[75] Inventor: Paul P. Greigger, Allison Park, Pa.

[73] Assignee: PPG Industries, Inc., Pittsburgh, Pa.

[21] Appl. No.: 384,368

[22] Filed: Jun. 2, 1982

[51] Int. Cl.³ .................... C09K 3/00; C08G 77/06
[52] U.S. Cl. .................... 106/287.16; 428/429; 428/447; 524/417; 524/711; 528/12; 528/20; 528/23; 106/287.12
[58] Field of Search .............. 528/12, 20; 106/287.12, 106/287.16; 524/417; 428/412

[56] References Cited

U.S. PATENT DOCUMENTS

| | | | |
|---|---|---|---|
| 2,568,384 | 9/1951 | Cheronis | 260/33.6 |
| 2,610,167 | 9/1952 | TeGrotenhuis | 260/37.5 |
| 2,676,182 | 4/1954 | Daudt et al. | 260/448.2 |
| 2,786,042 | 3/1957 | Iler et al. | 260/37 |
| 3,232,771 | 2/1966 | Pearce | 106/38.35 |
| 3,435,001 | 3/1969 | Merrill et al. | 260/46.5 |
| 3,682,668 | 8/1972 | Fujita et al. | 106/74 |
| 3,894,881 | 7/1975 | Suzuki et al. | 106/287 |
| 3,959,566 | 5/1976 | Pangonis | 428/446 |
| 3,976,497 | 8/1976 | Clark | 106/287 |
| 3,986,997 | 10/1976 | Clark | 260/29.2 |
| 4,016,129 | 4/1977 | Miyosawa | 260/29.6 |
| 4,024,306 | 5/1977 | Takamizawa et al. | 528/23 |
| 4,027,073 | 5/1977 | Clark | 428/412 |
| 4,113,665 | 9/1978 | Law et al. | 260/37 |
| 4,127,697 | 11/1978 | Laurin | 428/412 |
| 4,159,206 | 6/1979 | Armbruster et al. | 106/287 |
| 4,170,690 | 10/1979 | Armbruster et al. | 428/447 |
| 4,173,490 | 11/1979 | Rotenberg et al. | 106/287.14 |
| 4,173,553 | 11/1979 | Haluska | 260/29.2 |
| 4,177,315 | 12/1979 | Ubersax | 428/336 |
| 4,197,230 | 4/1980 | Baney et al. | 260/29.2 |
| 4,207,357 | 6/1980 | Goossens | 427/162 |
| 4,223,072 | 9/1980 | Baney et al. | 428/412 |
| 4,229,228 | 10/1980 | Rotenberg et al. | 106/287.14 |
| 4,243,692 | 1/1981 | Scholze et al. | 427/2 |
| 4,275,118 | 6/1981 | Baney et al. | 106/287.19 |
| 4,278,804 | 7/1981 | Ashby et al. | 556/416 |
| 4,290,811 | 9/1981 | Brown et al. | 106/1.17 |
| 4,299,746 | 11/1981 | Frye | 260/29.2 |
| 4,308,315 | 12/1981 | Frye | 428/331 |
| 4,311,738 | 1/1982 | Chi | 427/387 |

FOREIGN PATENT DOCUMENTS 2036053 6/1980 United Kingdom .
2036054 6/1980 United Kingdom .

*Primary Examiner*—Theodore Morris
*Attorney, Agent, or Firm*—Thomas M. Breininger

[57] ABSTRACT

Disclosed are coating compositions containing a vehicle comprising a dispersion of colloidal silica, a hydrolyzable alkoxysilane, an alcohol, water, and an acidifying agent selected from a soluble metal acid phosphate, phosphoric acid, and a mixture thereof.

12 Claims, No Drawings

STABLE INORGANIC COATING COMPOSITION FOR ADHERENT, INORGANIC COATINGS

BACKGROUND OF THE INVENTION

1. Field of Invention

This invention relates to coating compositions containing colloidal silica, alkoxysilanes, and acidifying agents, to methods of preparation and use, and to coated articles therefrom.

2. Description of the Prior Art

Attempts have been made to provide stable coating compositions based on aqueous colloidal silica, alkoxysilanes and various acids which cure to adherent crack and temperature resistant, glossy coatings. However, achievement of these goals has been elusive, especially the attainment of stable compositions which are pigmented and yet provide cured coatings which are highly adherent, for example to a metal substrate, are highly temperature resistant, and exhibit a high degree of gloss.

U.S. Pat. No. 3,976,497 to Clark relates to a paint composition containing a pigment carried in a vehicle consisting essentially of a dispersion of colloidal silica in a lower aliphatic alcohol-water solution of the partial condensate of a silanol of the formula $RSi(OH)_3$ in which R is selected from specified groups at least 70 weight percent of the silanol being $CH_3Si(OH)_3$. The vehicle contains 10 to 50 weight percent solids consisting essentially of 10 to 70 weight percent colloidal silica and 30 to 90 weight percent of the partial condensate. The vehicle further contains sufficient acid to provide a pH in the range of 3.0 to 6.0. The acids disclosed as useful include such inorganic and organic acids as hydrochloric, acetic, formic, propionic, toluenesulfonic and oxalic among others. These reference compositions while providing coatings having improved abrasion resistance suffer from some disadvantages. For example, the stability of these reference compositions is inadequate. Additionally, coatings prepared from these reference compositions tend to lose adhesion from a steel substrate after curing if applied so as to produce dry film thicknesses greater than about 0.5 mils ($1.27 \times 10^{-5}$ meters).

U.S. Pat. No. 4,159,206 to Armbruster et al is directed to compositions having improved craze resistance and weatherability over compositions of the type disclosed in U.S. Pat. No. 3,976,497. The compositions of U.S. Pat. No. 4,159,206 do not contain pigment. These unpigmented compositions contain colloidal silica and a mixture of dialkyldialkoxysilane and alkyltrialkoxysilane such as dimethyldimethoxysilane and methyltrimethoxysilane prepared by adding a mixture of dialkoxysilane and trialkoxysilane to colloidal silica hydrosols and adjusting the pH with sufficient acid to provide a pH in the range of 3.0 to 6.0. The acids disclosed as useful for adjusting the pH in U.S. Pat. No. 4,159,206 are the same as those disclosed as useful for adjusting the pH in U.S. Pat. No. 3,976,497.

U.S. Pat. No. 3,986,997 to Clark relates to a pigment-free coating composition containing essentially the same components as in U.S. Pat. No. 3,976,497 except without pigment.

U.S. Pat. No. 4,197,230 to Baney et al relates to a modification in the pigment-free compositions shown in U.S. Pat. No. 3,986,997 to Clark by incorporation into the Clark composition of at least 1 weight percent of $\phi$ $Si(OH)_3$ based on the weight of total $RSi(OH)_3$ present in the composition.

The present invention is directed to compositions based on a dispersion of colloidal silica, water and alkoxysilanes which have improved stability and can provide coatings which are temperature resistant, water resistant, crack resistant, highly adherent, and/or glossy.

SUMMARY OF THE PRESENT INVENTION

Compositions of the present invention comprise: a dispersion of colloidal silica, a hydrolyzable alkoxysilane, alcohol, water, an acidifying agent, and optionally a pigment. The acidifying agent in compositions of the invention comprises a soluble metal acid phosphate and/or phosphoric acid. Compositions of the invention containing soluble metal acid phosphate as acidifying agent have enhanced stability over known compositions having vehicles based on colloidal silica, alkoxysilane, water and alcohol. The compositions having phosphoric acid as the acidifying agent while providing a number of advantages over known compositions having vehicles based on colloidal silica, alkoxysilane, water and alcohol, do not provide the enhanced stability provided by the compositions containing soluble metal acid phosphate.

DETAILED DESCRIPTION OF THE INVENTION

A composition of the invention comprises:
I. a vehicle comprising,
   A. a dispersion of colloidal silica,
   B. a hydrolyzable alkoxysilane,
   C. an alcohol,
   D. water, and
   E. sufficient soluble acidifying agent to provide a pH of the vehicle ranging from about 2.8 to about 6 wherein the soluble acidifying agent is selected from a soluble metal acid phosphate, phosphoric acid and a mixture thereof, and
II. optionally a pigment.

The silica is present in the vehicle in the form of a colloidal dispersion. It is to be understood that the colloidal silica may be provided from any suitable source including, for example, colloidal silica dispersed in essentially an organic solvent such as ethylene glycol monoethyl ether and colloidal silica dispersed in water. However, it is preferred to utilize an aqueous dispersion of colloidal silica as the source of colloidal silica for the vehicle in a composition of the invention.

Aqueous dispersions of colloidal silica suitable in the present invention generally have an average particle size ranging from about 5 to 150 milligrams (about $50 \times 10^{-10}$ to $1500 \times 10^{-10}$ meters). These silica dispersions are generally known, examples of which include those sold under the trademarks of "Ludox" (E. I. duPont de Nemours), "Nalcoag" (NALCO Chemical Company) and "Nyacol" (PQ Corporation). Such colloidal silicas are available as both acidic and basic hydrosols and both types are suitable for the purposes of the present invention.

Basic, aqueous dispersions of colloidal silica such as "Nalcoag 1060" are suitable and in certain circumstances are even preferable. The pH of these basic colloidal silicas is adjusted using an acidifying agent during preparation of the compositions of the invention. Colloidal silicas are to be distinguished from either water dispersible forms of SiO$_2$, such as polysilicic acid, or aqueous alkali metal silicates.

Alkoxysilanes useful in compositions of the invention are hydrolyzable and comprise hydrolyzable trialkoxysilanes, hydrolyzable dialkoxysilanes, or mixtures thereof.

Hydrolyzable trialkoxysilanes useful in compositions of the invention generally correspond to the formula $$RSi(OR')_3$$

wherein,

R is selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical; and R' is selected from the group consisting of methyl, ethyl, n-propyl, isopropyl, and n-butyl.

Examples of hydrolyzable trialkoxysilanes include: methyltrimethoxysilane, methyltriethoxysilane, propyltrimethoxysilane, propyltriethoxysilane, phenyltrimethoxysilane, vinyltrimethoxysilane, vinyltriethoxysilane, gamma-methacryloxypropyltrimethoxysilane, gamma-glycidoxypropyltrimethoxysilane, and gamma-glycidoxypropyltriethoxysilane. Of the above hydrolyzable trialkoxysilanes, methyltrimethoxysilane is preferred. Mixtures of trialkoxysilanes also may be used in compositions of the invention.

Hydrolyzable dialkoxysilanes useful in compositions of the invention generally correspond to the formula $$R\,R''Si(OR')_2$$

wherein,

R and R" independently are selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical; and R' is selected from the group consisting of methyl, ethyl, n-propyl, isopropyl, and n-butyl.

Examples of hydrolyzable dialkoxysilanes include dimethyldimethoxysilane, dimethyldiethoxysilane, dipropyldimethoxysilane, dipropyldiethoxysilane, methylphenyldimethoxysilane, methyl (gamma-glycidoxypropyl) dimethoxysilane and methyl (gamma-methacryloxypropyl) dimethoxysilane. Of the above dialkoxysilanes, dimethyldimethoxysilane is preferred. Mixtures of dialkoxysilanes also may be used in compositions of the invention.

Mixtures of hydrolyzable trialkoxysilanes and hydrolyzable dialkoxysilanes can be utilized in compositions of the present invention. It should be pointed out that compositions containing pigment and a vehicle comprising a dispersion of colloidal silica, a mixture of hydrolyzable trialkoxysilane and hydrolyzable dialkoxysilane, alcohol, water, and acidifying agent are the subject of U.S. patent application to Paul P. Greigger et al filed the same day as the present application. Mixtures of the hydrolyzable trialkoxysilanes and hydrolyzable dialkoxysilanes are preferred as the alkoxysilane component in compositions of the present invention.

Alkoxysilanes suitable for compositions of the present invention are hydrolyzable materials. In aqueous media they can at least partially hydrolyze to the corresponding silanols which can, in turn, at least partially condense to form mixtures of compounds containing siloxane linkages. For example, hydrolysis of alkoxysilanes containing methoxy, ethoxy, propoxy and n-butoxy substituents produces the corresponding alcohols and silanols. The silanols partially condense in aqueous media to form

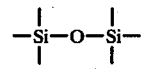

linkages. The condensation, for example, in acidic aqueous media, takes place over a period of time and may not be complete such that the siloxane material may retain an appreciable quantity of silicon-bonded hydroxyl groups. The presence of these residual hydroxyl groups in partially condensed alkoxysilanes is believed to not only contribute to the solubility of the condensed material in water but also to provide sites for at least partial reaction with hydroxyl groups believed to be present at the surface of colloidal silica particles in the aqueous dispersion of colloidal silica. Although alkoxysilanes which have been hydrolyzed and partially condensed without the presence of colloidal silica are useful in compositions of the invention, it is preferred that the compositions contain alkoxysilanes hydrolyzed and partially condensed in the presence of colloidal silica. Cured coatings prepared from mixtures of hydrolyzable trialkoxysilanes and hydrolyzable dialkoxysilanes partially condensed in the presence of colloidal silica typically are more adherent to the substrate and crack resistant than those prepared from mixtures of the alkoxysilanes hydrolyzed and partially condensed separate from the colloidal silica component.

Alcohols useful in compositions of the invention typically include lower aliphatic alcohols which are miscible with water such as methanol, ethanol, isopropanol, and tertiary-butanol. Mixtures of such alcohols can be utilized. Of the above alcohols, isopropanol is preferred and when mixtures of alcohols are used, it is preferred that at least 50 weight percent of isopropanol be present in such mixture.

The vehicle of the composition contains sufficient acidifying agent to provide a pH ranging from about 2.8 to about 6.0, preferably from about 3.5 to about 4.5. A composition of the invention incorporates an acidifying agent which is selected from a soluble metal acid phosphate and/or phosphoric acid. The soluble metal acid phosphate is the preferred acidifying agent because not only do cured coatings prepared from compositions of the invention containing soluble metal acid phosphate have advantageous properties such as temperature resistance, water resistance, crack resistance, adhesion and gloss, but also the uncured compositions have highly desirable, improved composition stability. The compositions of the invention having phosphoric acid as the acidifying agent while providing a number of advantages over known compositions having vehicles based on colloidal silica, alkoxysilane and alcohol, do not provide the enhanced stability provided by the composition containing soluble metal acid phosphate. Composition stability, as will be appreciated by those skilled in the art, is very important particularly in one package coating compositions. Examples of such acidifying agents include aluminum dihydrogen phosphate, calcium dihydrogen phosphate, chromium (III) dihydrogen phosphate, iron (III) dihydrogen phosphate, manganese (II) dihydrogen phosphate and the like. Further examples of such acidifying agents include the soluble forms of polymeric metal phosphates such as the soluble forms of generally known condensed metal phosphates produced, for example, by heating and at least partially dehydrating a nonpolymeric metal phosphate such as aluminum dihydrogen phosphate. Additionally, mixtures of the acidifying agents also may be utilized. Of the above metal acid phosphate acidifying agents, aluminum dihydrogen phosphate is preferred. Compositions in which such a soluble metal acid phosphate acidifying agent is present tend to be more stable than compositions containing acids such as those disclosed in U.S. Pat. No. 3,976,497 at column 2, lines 63–67. Additionally, compositions of the invention containing the required acidifying agent provide cured coatings which tend to be more adherent to the substrate than the compositions without the required acidifying agent present.

In addition to the required acidifying agents discussed above, compositions of the invention may include one or more acids such as hydrochloric, acetic, chloroacetic, citric, benzoic, dimethylmalonic, formic, glutaric, glycolic, maleic, malonic, toluene sulfonic, oxalic and the like. However, it is preferred that compositions of the invention not contain these optional acids since it is believed that such optional acids may tend to destabilize the compositions.

The vehicle portion of a composition of the invention typically is prepared by adding the alkoxysilane component to an aqueous dispersion of colloidal silica and adjusting the pH to the desired level by addition of the acidifying agent. As used herein the vehicle is understood to include the components of the composition except for any pigment which may be present. The acidifying agent can be combined with the alkoxysilane component or with the aqueous dispersion of colloidal silica before mixing the alkoxysilane with the colloidal silica. Typically, the acidifying agent is combined with the aqueous dispersion of colloidal silica before combining the alkoxysilane component with the silica. The amount of acidifying agent necessary to obtain the desired pH will vary depending on the alkali content of the aqueous dispersion of colloidal silica but is usually less than about 1 percent by weight of the composition.

Alcohol is generated by hydrolysis of silicon-bonded alkoxy substituents on the alkoxysilane component. For example, hydrolysis of one mole of methyltrimethoxysilane, assuming complete hydrolysis of the methoxy substituents, can generate 3 moles of methanol. Alcohol generated by hydrolysis of the alkoxysilane component is to be considered at least part of the alcohol component of a composition of the invention. Depending on the weight percent solids desired in the final vehicle component, additional alcohol water, or a water-miscible solvent such as acetone, butyl cellosolve and the like, can be added.

Following combination of the typically aqueous colloidal silica, alkoxysilane component, and acidifying agent, the vehicle is stirred at room temperature typically for several hours. During this period, the vehicle becomes an essentially single phase material while hydrolysis and partial condensation occurs. The vehicle thus obtained typically is a milky white, low viscosity dispersion which typically is stable against gelation at room temperature for a period as long as 6 months or longer. Compositions of the invention containing pigment typically are stable at 120° F. (48.9° C.) for periods at least as long as 4 weeks or longer.

Optionally, latent condensation catalysts and catalysts for the vehicle as described in U.S. Pat. No. 3,976,497 at column 3, lines 38–62 can be incorporated in the compositions of the present invention, and lines 38–62, column 3, of U.S. Pat. No. 3,976,497 are hereby incorporated by refernce. However, it has been found that compositions of the present invention particularly those incorporating the soluble metal acid phosphate acidifying agent can be prepared without the catalysts described in U.S. Pat. No. 3,976,497 and yet cure to films having excellent properties. Compositions of the present invention which do not contain such catalysts are in fact preferred.

A wide variety of pigments can be incorporated in compositions of the invention. Examples of suitable pigments include: white and colored pigments based on titanium dioxide, iron oxide red, iron oxide black, manganese black, carbon in its various forms, barium yellow, strontium chromate, calcium chromate, zinc yellow, zinc green, cadmium yellow, cadmium red, cadmium vermilion, cadmopone, vermilion, ultramarine, lead chromate, chromium yellow, molybdate red, molybdate orange, chromoxide green, chromoxidehydrate green, manganese violet, manganese blue, cobalt blue, cobalt green, cobalt violet, naples yellow, alkaline earth carbonates such as chalk, magnesium carbonate, dolomite, precipitated calcium carbonate and barium carbonate, talc, alumina hydrates, zinc oxide, magnesium oxide, fluorite, basic lead carbonate, organic pigments of the azo series, and mixtures thereof. Ceramic and vitreous frits can also be used in the pigment portion of compositions of the invention. Powdered metals such as zinc dust, aluminum flakes, bronze powder and the like, form another class of pigments suitable for use in the present invention. Glass beads can be incorporated in the pigments to provide a reflective coating such as used on highway signs and pavement markings. The pigments listed above are merely illustrative of the large number of generally known pigments. A detailed listing of both organic and inorganic pigments can be found in *The Encyclopedia of Chemistry*, Clark and Hawley, Reinhold Publishing Corp., New York (1966) beginning at page 833.

Typically, a pigment is incorporated in a composition of the invention following combination of the colloidal silica, the alkoxysilane component, water, and acidifying agent.

Coating compositions of the invention may include additives generally known in the art such as dyes, defoamers, release agents, antimar agents, flow control agents, surfactants, thickeners, fungicides and mildewcides.

As stated previously, the vehicle is understood to include the components of the composition of the invention except for pigment. Thus, the vehicle of a composition of the invention is understood to include, for example, the colloidal silica, the hydrolyzable alkoxysilane, the alcohol, the water, the acidifying agent, and any organic solvents and additives which may be present. The water is understood to include water from any source, for example, the water in an aqueous dispersion of colloidal silica which typically is used to provide the colloidal silica in a composition of the invention, and water which can be added separately during formulation of a composition of the invention as, for example, where a dispersion of colloidal silica in organic solvent rather than water is used as the source of colloidal silica.

The vehicle component of a composition of the invention generally contains from about 10 to about 60 percent by weight total solids based on the sum by weight of silica solids and alkoxysilane component (i.e., excluding pigment) in the total weight of the vehicle. Whenever used herein, the alkoxysilane solids from the alkoxysilane component are calculated on the basis of the corresponding hydrolyzed species (i.e., the corresponding silanols) assuming for purposes of calculation a theoretical extent of hydrolysis of 100 percent. Thus, for example, the amount of dimethyldimethoxysilane as a percent of total solids of a composition would be calculated on the basis of the corresponding silanol, $(CH_3)_2Si(OH)_2$.

In preferred compositions of the invention wherein a mixture of trialkoxysilane and dialkoxysilane is utilized as the alkoxysilane component, the ratio by weight of trialkoxysilane to dialkoxysilane solids (calculated on the basis of the corresponding hydrolyzed species as discussed above) in the vehicle may vary widely. However, in preferred compositions, this ratio typically ranges from about 93:7 to about 50:50. Compositions of the invention containing pigment wherein the combination of hydrolyzable trialkoxysilane and hydrolyzable dialkoxysilane is used as the alkoxysilane component are not nearly as subject to the problems of loss of adhesion to the substrate and cracking as are, for example, the coatings prepared from the pigmented compositions disclosed in U.S. Pat. No. 3,976,497, particularly at dry film thicknesses greater than about 0.5 mils ($1.27 \times 10^{-5}$ meters). The ability of compositions of the invention containing pigment and a mixture of hydrolyzable trialkoxysilane and hydrolyzable dialkoxysilane to resist loss of adhesion and cracking at such higher dry film thicknesses is especially important considering the difficulty in controlling application parameters for coating compositions to consistently provide dry film thicknesses, for example, of less than about 0.5 mils ($1.27 \times 10^{-5}$ meters). The resistance to loss of adhesion and cracking of cured films prepared from compositions of the invention even without incorporating reinforcing materials such as mica is especially noteworthy.

The amount of silica solids (calculated as $SiO_2$) in the vehicle as a percent of total solids defined above generally ranges from about 10 to about 80 percent by weight, preferably from about 40 to about 60 percent by weight. The amount of alkoxysilane solids as a percent of total solids defined above generally range from about 20 to about 90 percent by weight of the total solids, the alkoxysilane solids calculated on the basis of the hydrolyzed species assuming for purposes of calculation theoretically complete hydrolysis of the alkoxysilane to the respective silanol.

The amount of water in a composition of the invention may vary widely. The amount by weight of water based on the total weight of the vehicle component of a composition of the invention generally may range from about 1 percent to about 90 percent by weight and typically ranges from about 10 percent to about 70 percent by weight.

The amount of pigment in a composition of the invention generally ranges from 0 to about 80 percent by volume solids, typically from about 10 to about 80 percent by volume solids, based on the total volume of solids present in the composition. Where highly glossy, pigmented, cured coatings are desired, typically an amount of pigment up to about 40 percent by volume solids is employed.

The ratio of the weight of pigment to the weight of binder (i.e., P/B ratio) in a composition of the invention will vary, for example, depending on the density of the pigment utilized in the composition. However, generally the P/B ratio in a composition of the invention ranges from 0/1 to about 10/1, and typically, where glossy cured coatings are desired, ranges from about 0.1/1 to about 2/1. As used in the present context, the binder is understood to include the silica solids calculated as $SiO_2$ and the alkoxysilane component calculated on the basis of the corresponding hydrolyzed species assuming for purposes of calculation a theoretical extent of hydrolysis of 100 percent.

Compositions of the invention are particularly useful as stable coating compositions to provide cured films which are glossy, highly adherent and crack resistant even at high temperatures. They may be applied to a wide variety of substrates including, for example, metal, glass, ceramic materials, wood, wallboard, cement, and the like. They are especially useful for providing highly adherent coatings over metal substrates. Coating compositions of the invention also may be particularly useful as relatively low temperature curing substitutes for porcelain. The coating compositions may be applied by any known method including, for example, brushing, dipping, flow coating, doctor roll coating, spraying and the like. Generally known spray techniques and equipment may be utilized.

Properties of the cured compositions of the invention vary depending on the temperature at which the compositions are cured.

The following examples illustrate the invention. Amounts and percentages are by weight unless specified otherwise. When used herein, "pbw" means "parts by weight." Tests referred to in the following examples are conducted as follows.

TESTS (1) Adhesion—Adhesion is measured by scoring the coating down to the substrate with a razor blade in a crosshatch pattern thereby defining a plurality of approximately square areas each having a dimension of about 2 millimeters by 2 millmeters. Masking tape 2 inches wide (SCOTCH Masking Tape from 3M Corporation) is applied securely to the scored surface of the coating and then is ripped quickly from the scored area. The numerical value given for the test represents the scored area which is not removed by the tape.

(2) Hardness—An EAGLE Turquoise Drawing Pencil (from BEROL Corporation) is sharpened and the point is sanded to provide a flattened surface. The flattened tip is scraped at about a 45° angle to the coating while strong downward pressure is applied to the pencil. The value for hardness represents the designation of the "lead" in the hardest EAGLE Turquoise Drawing Pencil which does not scratch the coating in this test.

(3) Gloss 60° —The value for gloss 60° represents the percent specular reflectance of light from the surface of the coating at an angle of 60 degrees from the direction normal to the surface of the coating.

(4) Adhesion/Boiling Water—A substrate having a cured coating thereon is soaked in boiling water for 24 hours and thereafter rinsed with tap water and allowed to dry at room temperature. Next, the adhesion test described above is performed on the cured coating.

(5) Gloss 60°/Heat—A substrate having a cured coating thereon is heated at 700° F. (371° C.) for 6 hours.

Next, the Gloss 60° test described above is performed on the cured coating.

(6) Adhesion/Heat—A substrate having a cured coating thereon is heated at 700° F. (371° C.) for 6 hours. Next, the first adhesion test described above is performed on the cured coating.

(7) Double Rubs/Water Soak—The number of double rubs is understood to mean the number of back and forth finger rubs with a cloth dipped in water across a coating that has been soaked in water at room temperature for 1 hour. The number of double rubs indicated is the number that the cured coating can withstand before the substrate becomes visible through the coating.

(8) Hardness/Heat—A substrate having a cured coating thereon is heated to 700° F. (371° C.) for 6 hours. Next, the hardness test described above is performed on the cured coating.

EXAMPLE 1

(a) 60 pbw of aqueous colloidal silica having a silica solids content of 50 percent by weight and an average silica particle size of 60 millimicrons ($60 \times 10^{-9}$ meters) available as Nalcoag 1060 from NALCO Chemical Company is acidified at room temperature to a pH of $4.0 \pm 0.1$ with an aqueous solution of aluminum dihydrogen phosphate (from Alfa Products, Thiokol/Ventron Division, having the following analysis assay: 30 percent by weight as $P_2O_5$ and 7 percent by weight as $Al_2O_3$).

(b) Next, 37.0 pbw of methyltrimethoxysilane and 3.7 pbw of dimethyldimethoxysilane are mixed together and then added to the above acidified colloidal silica. The resulting composition is stirred at room temperature for about 18 to 24 hours. Following stirring, the composition is a one-phase system.

(c) Next, 70 pbw of isopropanol is added to the composition produced in part (b) immediately above.

(d) Next, 43 pbw of a black inorganic pigment (available as Shepherd Black #101 from the Shepherd Chemical Company) is ground for about 5 minutes into the composition produced in part (c) immediately above using ZIRCOA beads spun by a TEFLON blade. The beads are then removed. The resulting material is a composition of the invention.

EXAMPLES 2-3

(a) The parts by weight indicated of the materials represented in the following TABLE 1 are combined in the following manner to produce the vehicles herein designated 2V and 3V.

Sufficient aqueous aluminum dihydrogen phosphate (described in Example 1) is added dropwise, at room temperature, with stirring to the aqueous colloidal silica to raise the pH of the aqueous colloidal silica to about 4. Next, a mixture of the methyltrimethoxysilane and the dimethyldimethoxysilane is added at room temperature with stirring to the aqueous colloidal silica whereupon a slight exotherm is observed. The resulting composition is stirred and allowed to hydrolyze for about 16 hours at room temperature. Next, the isopropanol is added at room temperature with stirring to produce the vehicle.

With 170.7 pbw of vehicle 2V and 137.4 pbw of vehicle 3V, each prepared as described above, is ground for 5 minutes utilizing ZIRCOA beads the amount by weight of pigment set forth in Table 1 to produce compositions of the invention herein designated 2C and 3C having a percent by volume of pigment of 22 percent and 10 percent, respectively.

TABLE 1

| Vehicle | 2V | 3V |
|---|---|---|
| Aqueous colloidal silica* | 60.0 | 60.0 |
| Aqueous aluminum dihydrogen phosphate** | To pH of about 4 | To pH of about 4 |
| Methyltrimethoxysilane | 37.0 | 37.0 |
| Dimethyldimethoxysilane | 3.7 | 3.7 |
| Isopropanol | 70.0 | 36.7 |
| Final Composition | 2C | 3C |
| Vehicle | 170.7 | 137.4 |
| Pigment*** | 43.0 | 17.0 |

*Nalcoag 1060 described in EXAMPLE 1.
**From Alfa Products and described in EXAMPLE 1.
***A pigment composition containing oxides of copper, manganese and chromium available as Shepherd Black No. 101 from Shepherd Chemical Company.

(b) The ZIRCOA beads are filtered from compositions 2C and 3C. Next, each of compositions 2C and 3C is sprayed onto two aluminum panels (available as ALODINE 407-47 pretreated panels from Amchem Products, Inc.). The compositions are cured to a dry film thickness of about 0.5 mil at either 350° F. (177° C.) for 5 minutes or 600° F. (316° C.) for 30 minutes as set forth in the following Table 2. Next, tests (1) and (3) through (6) described above are performed on the cured coatings prepared from compositions 2C and 3C. The results of the tests are set forth in Table 2.

TABLE 2

| Coating | Cure | Gloss 60° | Adhesion | Adhesion Boiling Water | Gloss 60°/ Heat | Adhesion/ Heat |
|---|---|---|---|---|---|---|
| 2C | 350° F./5 min | 22–28 | 95 | 0 | 17–19 | 95 |
| 2C | 600° F./30 min | 18–24 | 100 | 90 | 16–18 | 100 |
| 3C | 350° F./5 min | 59–68 | 100 | 10 | 53–56 | 95 |
| 3C | 600° F./30 min | 66–70 | 95 | 90 | 63–65 | 95 |

The following Example 4 illustrates the excellent storage stability of a composition of the invention.

EXAMPLE 4

(a) To 120.0 pbw of aqueous colloidal silica (Nalcoag 1060) is added dropwise with stirring sufficient aqueous aluminum dihydrogen phosphate (described in Example 1) to raise the pH of the aqueous colloidal silica to about 4.

Next, a mixture containing 46.0 pbw of methyltrimethoxysilane, 20.8 pbw of phenyltrimethoxysilane and 6.95 pbw of phenylmethyldimethoxysilane is added at room temperature with stirring to the aqueous colloidal silica. The resulting composition is stirred at room temperature for about 16 hours. Next, 110.0 pbw of isopropanol is added at room temperature with stirring to the composition to produce a vehicle herein designated 4V.

40.0 pbw of mica coated with titanium dioxide (available as Gold Afflair ® from EM Laboratories, Inc.) is ground with the vehicle 4V for 2 minutes utilizing ceramic beads to produce a pigmented coating composition herein designated 4C.

(b) A first glass panel, $P_1$, is spray coated with pigmented composition 4C shortly after the composition is prepared. The coating is cured at 250° F. (121° C.) for 30 minutes and tests (1)–(3) are conducted on the cured coatings. The test results are summarized in the following Table 3.

A second glass panel, $P_2$, is spray coated with pigmented composition 4C which has been stored for 2 weeks at 120° F. (48.9° C.). The coating is cured at 250° F. (121° C.) for 30 minutes and tests (1)-(3) are conducted on the cured coatings. The tests results are summarized in Table 3.

A third glass panel, $P_3$, is spray coated with pigmented composition 4C which has been stored for 4 weeks at 120° F. (48.9° C.) and the coating cured and the tests conducted in the same manner as for the coatings on panels $P_1$ and $P_2$. The tests results are summarized in Table 3.

A fourth glass panel, $P_4$, is spray coated with pigmented composition 4C which has been stored for 4 weeks at 120° F. (48.9° C.) and has been allowed to remain at room temperature for an additional 85 days. The coating is cured and the tests conducted in the same manner as for the coatings on panels $P_1$, $P_2$, and $P_3$. The tests results are summarized in Table 3.

TABLE 3

| | Adhesion | Gloss 60° | Hardness |
|---|---|---|---|
| $P_1$/Composition 4C applied shortly after preparation | 95 | 15 | 3H |
| $P_2$/Composition 4C applied after 2 weeks at 120° F. | 95 | 13 | H |
| $P_3$/Composition 4C applied after 4 weeks at 120° F. | 90 | 12 | 3H |
| $P_4$/Composition 4C applied after 4 weeks at 120° F. followed by 85 days at room temperature | 95 | 11–12 | 3H |

Thus composition 4C is not only storage stable for at least 4 weeks at 120° F., but the cured coatings prepared from the stored composition 4C exhibit excellent properties.

The following Examples 5-11 illustrate coating compositions showing various ratios by weight of trialkoxysilane to dialkyoxysilane and some properties of the cured coatings prepared therefrom. The ratios by weight of trialkoxysilane to dialkoxysilane solids calculated on the basis of the corresponding silanols in compositions 10C and 11C fall outside the range of about 93:7 to about 50:50 for preferred compositions as discussed previously.

EXAMPLES 5-11

(a) The ingredients set forth in the following Table 4 are combined in the following manner to produce pigmented coating compositions herein designated 5C through 11C.

First a mixture of the aqueous colloidal silica and water is acidified to a pH in the range of 4-5. Next, the isopropanol or a mixture of isopropanol and ethylene glycol monoethyl ether is added with stirring to the acidified aqueous colloidal silica. Next, a mixture of the methyltrimethoxysilane and dimethyldimethoxysilane is added with stirring to the mixture containing the aqueous colloidal silica and isopropanol. The resulting composition is stirred at room temperature for about 16 hours after which the pigment is added to and dispersed in the composition to produce a pigmented coating composition containing 40 percent by volume pigment based on the total volume of solids in the coating composition. The ratio by weight of methyltrimethoxysilane to dimethyldimethoxysilane for each of coating compositions 5C through 11C is also set forth in Table 4. This ratio of alkoxysilane is calculated on the basis of the corresponding silanols, that is $CH_3Si(OH)_3$ and $(CH_3)_2Si(OH)_2$.

TABLE 4

| Composition | 5C | 6C | 7C | 8C | 9C | 10C | 11C |
|---|---|---|---|---|---|---|---|
| Colloidal silica[1] | 59.9 | 59.9 | 59.9 | 59.9 | 59.9 | 59.9 | 59.9 |
| Water | 25.9 | 25.9 | 102.0 | 25.9 | 25.9 | 25.9 | 25.9 |
| Aluminum dihydrogen phosphate[2] | To raise pH of colloidal silica and water to 4–5 | | | | | | |
| Isopropanol | 31.2 | 62.4 | — | 31.4 | 31.9 | 32.3 | 32.6 |
| Ethylene glycol monoethyl ether | 35.3 | — | — | 35.5 | 36.0 | 36.5 | 36.8 |
| Methyltrimethoxysilane | 36.5 | 36.5 | 36.5 | 30.5 | 20.3 | 10.1 | 4.1 |
| Dimethyldimethoxysilane | 3.2 | 3.2 | 3.2 | 8.1 | 16.2 | 24.3 | 29.2 |
| Titanium dioxide[3] | 77.9 | 77.9 | 77.9 | 80.4 | 83.7 | 87.2 | 89.5 |
| % by volume pigment | 40 | 40 | 40 | 40 | 40 | 40 | 40 |
| $CH_3Si(OH)_3$/$(CH_3)_2Si(OH)_2$ | 103/10 | 103/10 | 103/10 | 33.9/10 | 11.3/10 | 3.75/10 | 1.27/10 |
| P/B[4] | 1.35/1 | 1.35/1 | 1.35/1 | 1.40/1 | 1.48/1 | 1.57/1 | 1.62/1 |

[1] Nalcoag 1060 described in Example 1.
[2] Aqueous aluminum dihydrogen phosphate from Alfa Products described in Example 1.
[3] Pigment available as R-900 from E. I. duPont de Nemours and Company.
[4] Ratio by weight of pigment to binder.

(b) Each of the coating compositions 5C through 11C is spray coated to approximately the same film thickness onto a metal phosphate pretreated steel panel (BONDERITE-40 from Parker Division of Oxymetal Corp.) and a metal chromate/metal phosphate pretreated aluminum panel (ALODINE 407-47 from Amchem Products, Inc.). The coatings are cured at 250° F. (121° C.) for 30 minutes and tests (1) through (3) and (5) through (8) as described previously are performed on each of the cured coatings. The test results are summarized in the following Table 5.

TABLE 5

| Composition | 5C | 6C | 7C | 8C | 9C | 10C | 11C |
|---|---|---|---|---|---|---|---|
| Adhesion | | | | | | | |
| Aluminum | 100 | 100 | 100 | 100 | 100 | 100 | 100 |
| Steel | 100 | 100 | 100 | 100 | 100 | 100 | 100 |
| Hardness | | | | | | | |
| Aluminum | 2H | 3H | 2H | 2H | H | B | <4B |
| Steel | 8H | 8H | 8H | 8H | 2H | B | 4B |
| Double Rubs/Water Soak | | | | | | | |
| Aluminum | >200 | >200 | >200 | >200 | >200 | >200 | 25 |
| Steel | >200 | >200 | >200 | >200 | >200 | 100 | 7 |
| Gloss 60° | | | | | | | |
| Aluminum | 82–86 | 72–82 | Not measured/ | 89–93 | 88–90 | 81–85 | 70–79 |
| Steel | 72–79 | 66–77 | Many craters in film | 75–80 | 81–86 | 74–80 | 61–66 |
| Adhesion/Heat | | | | | | | |
| Aluminum | 100 | 100 | — | 100 | 100 | 100 | 95 |

TABLE 5-continued

| Composition | 5C | 6C | 7C | 8C | 9C | 10C | 11C |
| --- | --- | --- | --- | --- | --- | --- | --- |
| Steel | 70 | 80 | — | 70 | 95 | 90 | 5 |
| Gloss 60° Heat | | | | | | | |
| Aluminum | 82–84 | 73–78 | — | 86–88 | 88–92 | 81–83 | 67–73 |
| Steel | 72–73 | 55–61 | — | 75–80 | 81–85 | 71–76 | 55–60 |
| Hardness/Heat | | | | | | | |
| Aluminum | 3H | 3H | — | 3H | 3H | H | 4B |
| Steel | >9H | >9H | — | >9H | 8H | H | <4B |

The following Example 12 illustrates properties of cured films prepared from compositions utilizing acetic, citric, phosphoric, and sulfuric acids and aluminum dihydrogen phosphate.

EXAMPLE 12

(a) Five mixtures, each containing 59.9 pbw of Nalcoag 1060, and 25.9 pbw of water, are acidified to a pH of about 4 utilizing the five acidifying agents set forth in the following Table 6 to prepare five compositions. Next, a mixture of 36.4 pbw of methyltrimethoxysilane and 3.6 pbw of dimethyldimethoxysilane is added with stirring to each of the above five compositions after which each of the compositions is stirred at room temperature for 1½ hours. Next, 60.4 pbw of isopropanol is added at room temperature with stirring to each of the compositions followed by continued stirring at room temperature for about 16 hours. Next, 78.5 pbw of titanium dioxide pigment (R-900 from E. I. duPont de Nemours and Company) is ground for 5 minutes using ceramic beads into each of the five compositions to produce pigmented coating compositions each containing about 40 percent by volume pigment based on the total volume of solids in the composition or a ratio by weight of pigment to binder (P/B) of about 1.36/1.

(b) The ceramic beads are removed from the five coating compositions of part (a) immediately above, and the compositions are spray applied to zinc phosphate pretreated steel panels (BONDERITE-40) and cured for 30 minutes at 250° F. (121° C.) to produce coatings having the dry film thicknesses as set forth in Table 6. Next, tests (1) through (3) as described previously are performed on each of the cured coatings. The test results are summarized in Table 6.

TABLE 6

| Acidifying Agent | Al(H$_2$PO$_4$)$_3$[1] | Acetic[2] Acid | Citric[3] Acid | Phosphoric[4] Acid | Sulfuric[5] Acid |
| --- | --- | --- | --- | --- | --- |
| DFT (mil) | 0.8–1.0 | 0.7–0.8 | 0.5 | 1.1 | 0.8 |
| Adhesion | 85 | 20 | 95 | 80 | 90 |
| Gloss 60 | 83–88 | 69–75 | 15–17 | 77–82 | 62–67 |
| Hardness | 5H | 4H | HB | 4H | 4H |

[1]From Alfa products and described in Example 1.
[2]Glacial acetic acid.
[3]A 50 percent by weight solution of citric acid in H$_2$O.
[4]An 85 percent by weight solution of H$_3$PO$_4$ in H$_2$O.
[5]Reagent grade.

The following Example 13 illustrates the improved stability of a composition of the invention containing aluminum dihydrogen phosphate compared to compositions containing phosphoric acid or acetic acid.

EXAMPLE 13

(a) Three coating compositions herein designated 13A, 13B and 13C are prepared from the materials in the amounts by weight set forth in the following Table 7. The compositions are prepared according to the procedure described in Example 12 except that a mixture of isopropanol and ethylene glycol monoethyl ether is utilized in Example 13 instead of only isopropanol as in Example 12.

TABLE 7

| Composition | 13A | 13B | 13C |
| --- | --- | --- | --- |
| NALCOAG 1060 | 60 | 60 | 120 |
| Water | 26 | 26 | 52 |
| Aluminum dihydrogen phosphate[1] | to pH 4–5 | 0 | 0 |
| Phosphoric Acid[2] | 0 | to pH 4–5 | 0 |
| Acetic Acid[3] | 0 | 0 | to pH of 4 |
| Methyltrimethoxysilane | 37 | 37 | 74 |
| Dimethyldimethoxysilane | 3.7 | 3.7 | 7.4 |
| Isopropanol | 25.0 | 25.0 | 50 |
| Ethylene glycol monoethyl ether | 29 | 29 | 58 |
| Pigment[4] | 43 | 43 | 86 |

[1]From Alfa Products and described in Example 1.
[2]An 85 percent by weight solution of H$_3$PO$_4$ in H$_2$O.
[3]Glacial Acetic Acid.
[4]Shepherd Black No. 101 from Shepherd Chemical Company.

Compositions 13A, 13B and 13C are stored at 120° F. (48.9° C.). Composition 13B gels within 14 days and 13C gels within 19 days whereas composition 13A remains fluid even after 21 days.

Moreover, compositions of the invention similar to 13A such as composition 4C of Example 4 remained fluid after 4 weeks at 120° F. (48.9° C.) and an additional 85 days at room temperature.

The following Examples 14–15 illustrate the excellent storage stability of two compositions of the invention. Example 15 also illustrates a composition of the invention prepared from a mixture of soluble, acidic aluminum and chromium phosphates.

EXAMPLES 14–15

(a) Two samples herein designated 14S and 15S, each containing 240 pbw of Nalcoag 1060, are acidified to a pH of 4.0 as follows.

Sample 14S is acidified by adding at room temperature with stirring aluminum dihydrogen phosphate (from Alfa Products and described in Example 1) until a pH of 4.0 is obtained.

Sample 15S is acidified by adding at room temperature with stirring EMBIX (a green, aqueous solution from Hi-Purity Materials, Inc. containing about 50 percent by weight of acid aluminum chromium phosphate and having the following assay: about 30 percent by weight as P$_2$O$_5$, about 7.5 percent by weight as Al$_2$O$_3$, and about 4.5 percent by weight as Cr$_2$O$_3$).

(b) Next, 148 pbw of methyltrimethoxysilane and 14.8 pbw of dimethyldimethoxysilane is added at room temperature with stirring to each of samples 14S and 15S and allowed to hydrolyze overnight.

(c) Next, 201 pbw of each of samples 14S and 15S from part (b) immediately above is mixed at room temperature with 116 pbw of isopropanol and thereafter pigmented according to the procedure set forth in Example 12 with 80 pbw of titanium dioxide (available as R-900 from E. I. DuPont deNemours and Company) to produce compositions 14C and 15C respectively.

(d) Six aluminum panels (available as ALODINE 407-47 pretreated panels from Amchem Products, Inc.) are spray coated to about the same wet film thickness and the coatings cured as follows.

Two of the aluminum panels, herein designated P14(0) and P15(0), are spray coated with compositions 14C and 15C, respectively, shortly after the compositions are prepared. The coatings are both cured at 600° F. (316° C.) for 30 minutes and tests (1)–(3) are conducted on the cured coatings. The test results are summarized in the following Table 8.

Two of the aluminum panels, herein designated P14(1) and P15(1) are spray coated with compositions 14C and 15C, respectively, which have been stored for 1 week at 120° F. (48.9° C.). The coatings are cured and the tests are conducted in the same manner as for the coatings on panels P14(0) and P15(0). The test results are summarized in Table 8.

Two of the aluminum panels, herein designated P14(2) and P15(2) are spray coated with compositions 14C and 15C, respectively, which have been stored for 2 weeks at 120° F. (48.9° C.). The coatings are cured and the tests are conducted in the same manner as for the coatings on panels P14(0), P15(0), P14(1), and P15(1). The test results are summarized in Table 8.

TABLE 8

|  | Adhesion | Hardness | Gloss 60° |
|---|---|---|---|
| P14(0)/Composition 14C applied shortly after preparation | 100 | 2H | 56 |
| P15(0)/Composition 15C applied shortly after preparation | 100 | 4H | 52 |
| P14(1)/Composition 14C applied after 1 week at 120° F. | 90 | 7H | 13 |
| P15(1)/Composition 15C applied after 1 week at 120° F. | 100 | 7H | 20 |
| P14(2)/Composition 14C applied after 2 weeks at 120° F. | 100 | 3H | 15 |
| P15(2)/Composition 15C applied after 2 weeks at 120° F. | 95 | 7H | 15 |

The following Examples 16–17 illustrate the excellent properties of cured coatings prepared from two compositions of the invention each stored for various periods at both room temperature and 120° F. (48.9° C.). Example 17 also illustrates the use of the soluble portion of a polymeric metal phosphate as the acidifying agent.

EXAMPLES 16–17

(a) Two samples, herein designated 16S and 17S, each containing 120.0 pbw of Nalcoag 1060, are acidified to a pH or 4.0 as follows.

Sample 16S is acidified by adding at room temperature with stirring aluminum dihydrogen phosphate (from Alfa Products and described in Example 1) until a pH of 4.0 is obtained.

Sample 17S is acidified by adding at room temperature with stirring a condensed aluminum phosphate (available as HB Hardener from Pennwalt Corporation) until a pH of 4.0 is obtained and thereafter removing the insoluble portion of the condensed aluminum phosphate by filtration.

(b) Next, two compositions herein designated 16C and 17C are prepared from the acidified samples 16S and 17S, respectively, from part (a) immediately above by combining each of the acidified samples 16S and 17S according to the procedure described in parts (b) and (c) of Examples 14–15 immediately above with the following ingredients: a mixture of 74.0 pbw of methyltrimethoxysilane with 7.4 pbw of dimethyldimethoxysilane, 116.0 pbw of isopropanol, and 80.0 pbw of titanium dioxide pigment (R-900 from E. I. duPont deNemours and Company).

(c) Six aluminum panels of the type described in part (d) of Examples 14–15 are spray coated to about the same wet film thickness and the coatings cured as follows.

Two of the aluminum panels, herein designated P16(0) and P17(0), are spray coated with compositions 16C and 17C, respectively, shortly after the compositions are prepared. The coatings are both cured at 600° F. (316° C.) for 30 minutes and test (1)–(3) are conducted on the cured coatings. The test results are summarized in the following Table 9.

Two of the aluminum panels, herein designated P16(1) and P17(1) are spray coated with compositions 16C and 17C, respectively, which have been stored for 27 days at room temperature followed by 8 days at 120° F. (48.9° C.). The coatings are cured and the tests are conducted in the same manner as for the coatings on panels P16(0) and P17(0). The test results are summarized in Table 9.

Two of the aluminum panels, herein designated P16(2) and P17(2) are spray coated with compositions 16C and 17C, respectively, which have been stored for 27 days at room temperature followed by 8 days at 120° F. (48.9° C.) followed by an additional 18 days at room temperature followed by an additional 39 days at 120° F. (48.9° C.). The coatings are cured and the tests are conducted in the same manner as for panels P16(0), P17(0), P16(1) and P17(1). The test results are summarized in Table 9. "RT" in Table 9 represents "room temperature."

TABLE 9

|  | Adhesion | Hardness | Gloss 60° |
|---|---|---|---|
| P16(0)/Composition 16C applied shortly after preparation | 100 | 5H | 57 |
| P17(0)/Composition 17C applied shortly after preparation | 100 | 7H | 61 |
| P16(1)/Composition 16C applied after 27 days at RT and 8 days at 120° F. | 100 | 4H | 12 |
| P17(1)/Composition 17C applied after 27 days at RT and 8 days at 120° F. | 90 | 7H | 19 |
| P16(2)/Composition 16C applied after 27 days at RT, 8 days at 120° F., 18 days at RT and 39 days at 120° F. | 95 | 5H | 16 |
| P17(2)/Composition 17C applied after 27 days at RT, 8 days at 120° F., 18 days at RT and 39 days at 120° F. | 100 | 5H | 22 |

The following Examples 18–19 illustrate the excellent properties of cured coatings prepared from two compositions of the invention each stored for various periods at 120° F. (48.9° C.). Example 19 also illustrates a composition of the invention prepared from an aqueous solution containing calcium acid phosphate.

EXAMPLES 18–19

(a) An aqueous solution containing calcium acid phosphate is prepared as follows. An aqueous solution containing 85 percent by weight phosphoric acid is diluted with 54 pbw of distilled water. With the diluted phosphoric acid solution is reacted 14.8 pbw of calcium hydroxide. The reaction is exothermic. The reaction mixture is stirred for 1 hour and thereafter filtered to remove precipitate formed during the reaction. The filtrate is an aqueous solution containing calcium acid phosphate.

(b) Two samples herein designated 18S and 19S, each containing 300.0 pbw of Nalcoag 1060, are acidified to a pH of 4.0 as follows.

Sample 18S is acidified by adding at room temperature with stirring aluminum dihydrogen phosphate (from Alfa Products and described in Example 1) until a pH of 4.0 is obtained.

Sample 19S is acidified by adding at room temperature with stirring the calcium acid phosphate solution of part (a) immediately above until a pH of 4.0 is obtained.

(c) Next, a mixture of 185.0 pbw of methyltrimethoxysilane and 18.5 pbw of dimethyldimethosyxilane is added at room temperature with stirring to each of samples 18S and 19S and allowed to hydrolyze overnight.

(d) Next, 428.0 pbw of isopropanol is mixed at room temperature with each of samples 18S and 19S from part (c) immediately above. Thereafter, 372.6 pbw of each of the samples is pigmented according to the procedure set forth in Example 12 with 80 pbw of titanium dioxide (R-900 from E. I. duPont) to produce compositions 18C and 19C respectively.

(e) Eight aluminum panels of the type described in part (d) of Examples 14–15 are spray coated to about the same wet film thickness and the coatings cured as follows.

Two of the alminum panels, herein designated P18(0) and P19(0), are spray coated with compositions 18C and 19C, respectively, shortly after the compositions are prepared. The coatings are both cured at 600° F. (316° C.) for 30 minutes and tests (1)–(3) are conducted on the cured coatings. The test results are summarized in the following Table 10.

Two of the aluminum panels, herein designated P18(1) and P19(1) are spray coated with compositions 18C and 19C, respectively, which have been stored for 1 week at 120° F. (48.9° C.). The coatings are cured and the tests are conducted in the same manner as for the coatings on panels P18(0) and P19(0). The test results are summarized in Table 10.

Two of the aluminum panels, herein designated P18(2) and P19(2), are spray coated with compositions 18C and 19C, respectively, which have been stored for 2 weeks at 120° F. (48.9° C.). The coatings are cured and the tests are conducted in the same manner as for the coatings on panels P18(0), P19(0), P18(1) and P19(1). The test results are summarized in Table 10.

Two of the aluminum panels, herein designated P18(3) and P19(3), are spray coated with compositions 18C and 19C, respectively, which have been stored for 3 weeks at 120° F. (48.9° C.). The coatings are cured and the tests are conducted in the same manner as for the coatings on panels P18(0), P19(0), P18(1), P19(1), P18(2) and P19(2). The test results are summarized in Table 10.

TABLE 10

|  | Adhesion | Hardness | Gloss 60° |
|---|---|---|---|
| P18(0) | 100 | 2H | 65 |
| P19(0) | 100 | 2H | 37 |
| P18(1) | 100 | 4H | 24 |
| P19(1) | 100 | 4H | 46 |
| P18(2) | 100 | 4H | 14 |
| P19(2) | 100 | 3H | 23 |

TABLE 10-continued

|  | Adhesion | Hardness | Gloss 60° |
|---|---|---|---|
| P18(3) | 100 | 4H | 9 |
| P19(3) | 100 | 4H | 11 |

What is claimed is:
1. A composition comprising:
I. a vehicle comprising,
  A. a dispersion of colloidal silica,
  B. a hydrolyzable alkoxysilane,
  C. an alcohol,
  D. water, and
  E. a soluble acidifying agent in an amount sufficient to provide a pH of said vehicle ranging from about 2.8 to about 6.0 wherein said acidifying agent is a soluble metal acid phosphate, and
II. optionally a pigment.

2. The composition of claim 1 wherein said metal acid phosphate is selected from aluminum dihydrogen phosphate, calcium dihydrogen phosphate, chromium (III) dihydrogen phosphate, iron (III) dihydrogen phosphate, manganese (II) dihydrogen phosphate and mixtures thereof.

3. The composition of claim 2 wherein said acidifying agent comprises aluminum dihydrogen phosphate.

4. The composition of claim 1 wherein said hydrolyzable alkoxysilane comprises a mixture of (i) a hydrolyzable trialkoxysilane and (ii) a hydrolyzable dialkoxysilane.

5. The composition of claim 4 wherein said hydrolyzable trialkoxysilane corresponds to the formula

RSi(OR')$_3$ wherein,
R is selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical, and
R' is selected from the group consisting of methyl, ethyl, n-propyl, isopropyl, and n-butyl.

6. The composition of claim 5 wherein said hydrolyzable dialkoxysilane corresponds to the formula

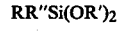
RR''Si(OR')$_2$ wherein,
R and R'' independently are selected from the group consisting of alkyl radicals having 1 to 5 carbon atoms, the phenyl radical, the vinyl radical, the 3,3,3-trifluoropropyl radical, the gamma-glycidoxypropyl radical, and the gamma-methacryloxypropyl radical, and
R' is selected from the group consisting of methyl, ethyl, n-propyl, isopropyl, and n-butyl.

7. The composition of claim 1 wherein said vehicle contains about 10 to about 60 percent by weight total solids based on the sum by weight of colloidal silica solids and alkoxysilane solids in the total weight of the vehicle, the alkoxysilane solids calculated assuming theoretically complete hydrolysis of said alkoxysilane to the corresponding silanol; colloidal silica solids representing about 10 to about 80 percent by weight of said sum; and alkoxysilane solids representing about 20 to about 90 percent by weight of said sum.

8. The composition of claim 7 further comprising a pigment in an amount ranging from about 10 to about 80 percent by volume solids based on the total volume of solids present in said composition.

9. The composition of claim 8 wherein said hydrolyzable alkoxysilane comprises a mixture of (i) a hydrolyzable trialkoxysilane and (ii) a hydrolyzable dialkoxysilane.

10. The composition of claim 9 wherein the ratio by weight of said trialkoxysilane to said dialkoxysilane, respectively, ranges from about 93:7 to about 50:50, the amounts of trialkoxysilane and dialkoxysilane calculated on the basis of the hydrolyzed species assuming theoretically complete hydrolysis to the respective silanols.

11. The composition of claim 10 wherein said trialkoxysilane comprises methyltrimethoxysilane, said dialkoxysilane comprises dimethyldimethoxysilane, and said acidifying agent comprises aluminum dihydrogen phosphate.

12. The composition of claim 10 wherein said water is in an amount ranging from about 1 percent to about 90 percent by weight based on the total weight of said vehicle.

* * * * *